Jan. 26, 1965  E. C. WESTERFIELD  3,167,738
SEQUENTIAL MATCHED FILTER
Filed May 22, 1962  4 Sheets-Sheet 1

INVENTOR.
EVERETT C. WESTERFIELD
BY
ATTORNEYS

Jan. 26, 1965   E. C. WESTERFIELD   3,167,738
SEQUENTIAL MATCHED FILTER
Filed May 22, 1962   4 Sheets-Sheet 4
FIG. 4
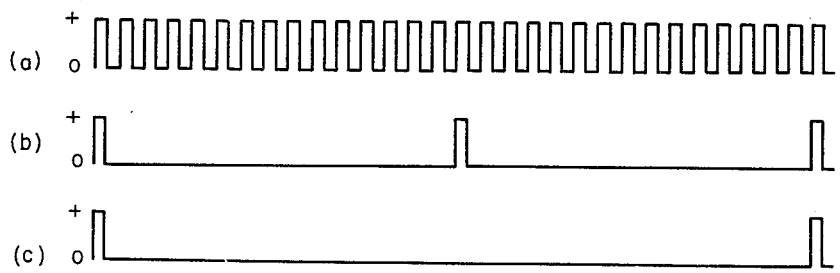
FIG. 5
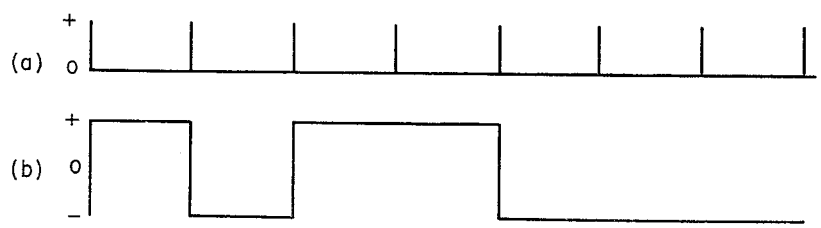
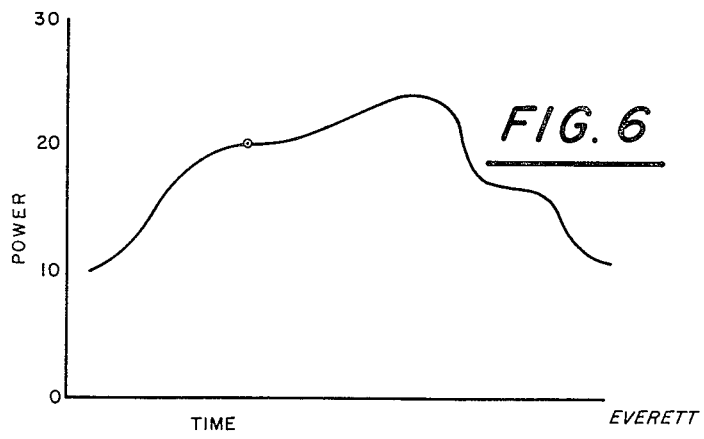
FIG. 6
INVENTOR.
EVERETT C. WESTERFIELD
BY
ATTORNEYS

United States Patent Office 3,167,738
Patented Jan. 26, 1965

3,167,738
SEQUENTIAL MATCHED FILTER
Everett C. Westerfield, San Diego, Calif., assignor to the United States of America as represented by the Secretary of the Navy
Filed May 22, 1962, Ser. No. 197,564
19 Claims. (Cl. 340—3)
(Granted under Title 35, U.S. Code (1952), sec. 266)

The invention herein described may be manufactured and used by or for the Government of the United States of America for governmental purposes without the payment of any royalties thereon or therefor.

This invention relates generally to statistical data analysis systems and in particular is a signal matching filter for statistically correlating input signals, containing known binary encoded signals that may have been altered to include such unknown parameters as noise, phase shift, and Doppler, with a replica of said known binary encoded signals.

In the past, several methods of detecting and decoding broadband signals having unknown phase shifts, Doppler frequency shifts, and spurious environmental noise signals superimposed thereon have been employed. For instance, one of the older methods consists of cross-correlating a received signal with one or more delayed Dopplerized replicas of the binary program known to have been encoded originally therein. However, this method has its disadvantages and leaves a great deal to be desired because it requires a separate correlation means for each delay and Doppler employed.

This invention further relates to echo-ranging systems and specifically concerns an improved method and means of statistically analyzing received sonar or radar signals, likewise containing phase shifts, frequency shifts, and noise signals, as well as a known binary code, which were previously broadcast as search signals in their respective environmental mediums.

Many of the more sophisticated prior art devices of this type also employ cross-correlation methods to analyze received echo-ranging signals, but since large numbers of target ranges and range rates must be searched rapidly in such systems, the number of correlators also may become excessive and physically burdensome. Moreover, in most prior art active correlation sonor systems employing broadband noise-like search signals, the difficult problem of storing the originally transmitted signal as a high fidelity reference signal occurs because obtaining the long-period, high-stability, non-dispersive delay lines necessary for bringing the reference signal and the received signal into correlation is arduous, excessively time consuming, and ordinarily involves physically cumbersome apparatus, too.

The sequential matched filter of the present invention accomplishes the proper storage and delay of a reference signal and automatically correlates an input signal, be it a received echo signal or any other type signal, on a statistical basis therewith by means of a unique combination of well known and conventional components which are electronically operated with no moving parts or burdensome structure.

It is, therefore, an object of this invention to provide an improved method and means of statistically correlating a binary type input signal with a predetermined binary coded reference signal.

Another object of this invention is to detect and correlate a signal having encoded binary components, phase shifts, frequency shifts, Doppler, and spurious noise incorporated therein with a program replica of said encoded binary components.

Still another object of this invention is to provide a method and means for sequentially matching a known binary encoded signal which may have been altered by phase shifts, frequency shifts, Doppler, and noise with a program replica of said known binary encoded signal.

A further object of this invention is to provide an improved echo-ranging system.

A further object of this invention is to provide an improved sonar system.

A still further objective of this invention is to provide a sequential matched filter that cross-correlates a received underwater target echo signal containing unknown phase shifts, frequency shifts, Doppler, and spurious noise modulations as well as intelligence or information characteristics in binary bit form with a program of binary bits representing an originally broadcast signal containing said same intelligence or information binary bit characteristics.

Another object of this invention is to provide an improved method and means for detecting broadband signals of long duration and known initial form but of unknown Doppler frequency shift and time delay.

A further object of this invention is to provide an improved method and means for determining range rate between two relatively moving objects.

Another object of this invention is to provide an echo-ranging system having an improved signal correlation means incorporated therein.

Still another object of this invention is to provide a sequential matched filter that is easily and economically constructed and maintained.

Other objects and many of the attendant advantages of this invention will be readily appreciated as the same becomes better understood by reference to the following detailed description when considered in conjunction with the accompanying drawings in which like reference numerals designate like parts throughout the figures thereof and wherein:

FIG. 4 is a graphical representation of the synchronized timing pulses generated in and by the invention;

FIG. 5 is a graphical representation of synchronized timing pulses and the generated exemplary binary program bits triggered thereby; and FIG. 6 is a graphical representation of power versus time that may occur at the output of any one output filter of the bank of output filters incorporated in the subject invention which, in turn, exemplarily indicates the degree of match between the sampled input signal and the encoded binary program.

Figure 1:
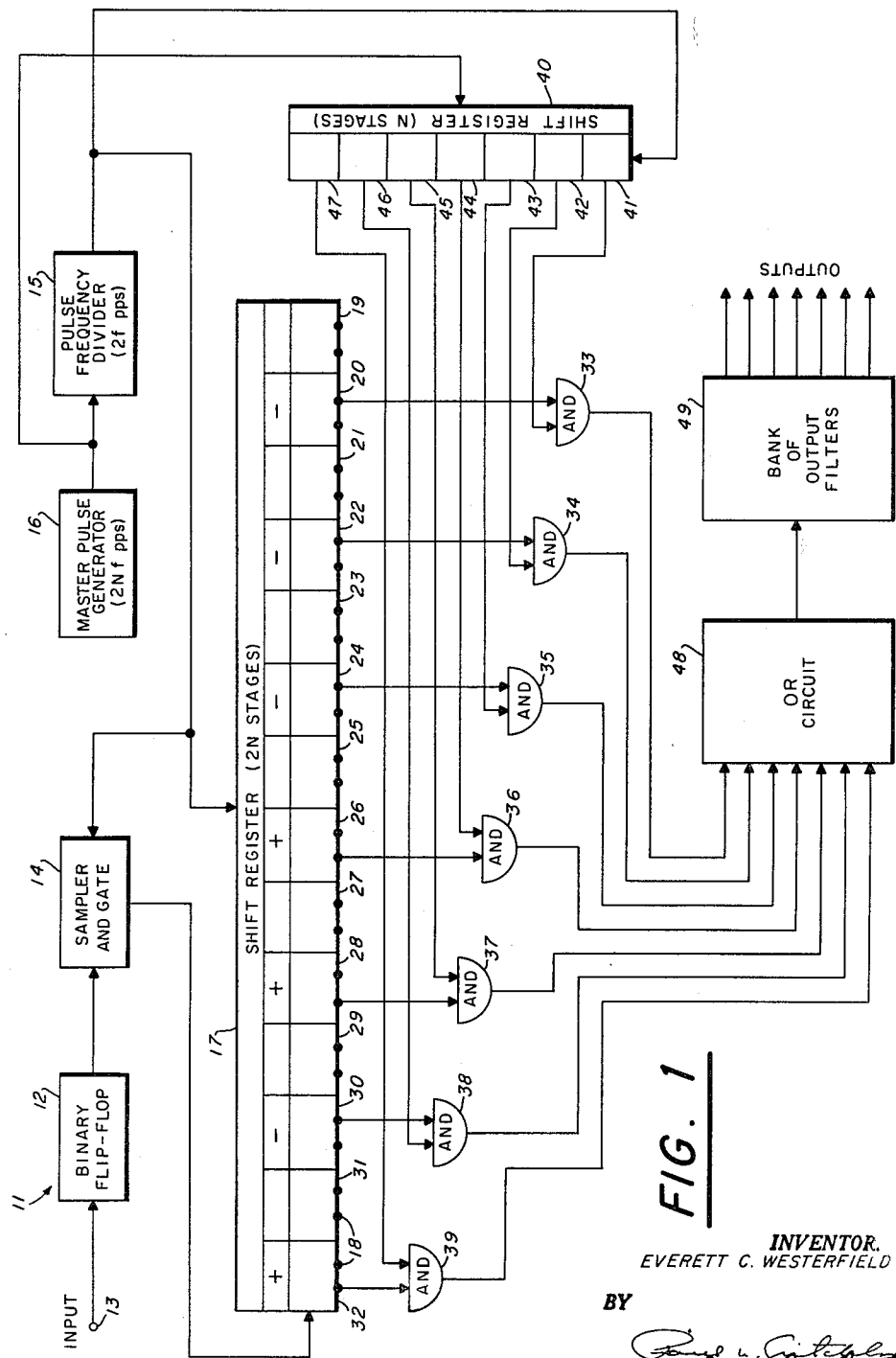
FIG. 1 is a block diagram which represents a preferred embodiment of the sequential matched filter of this invention.
Figure 2:
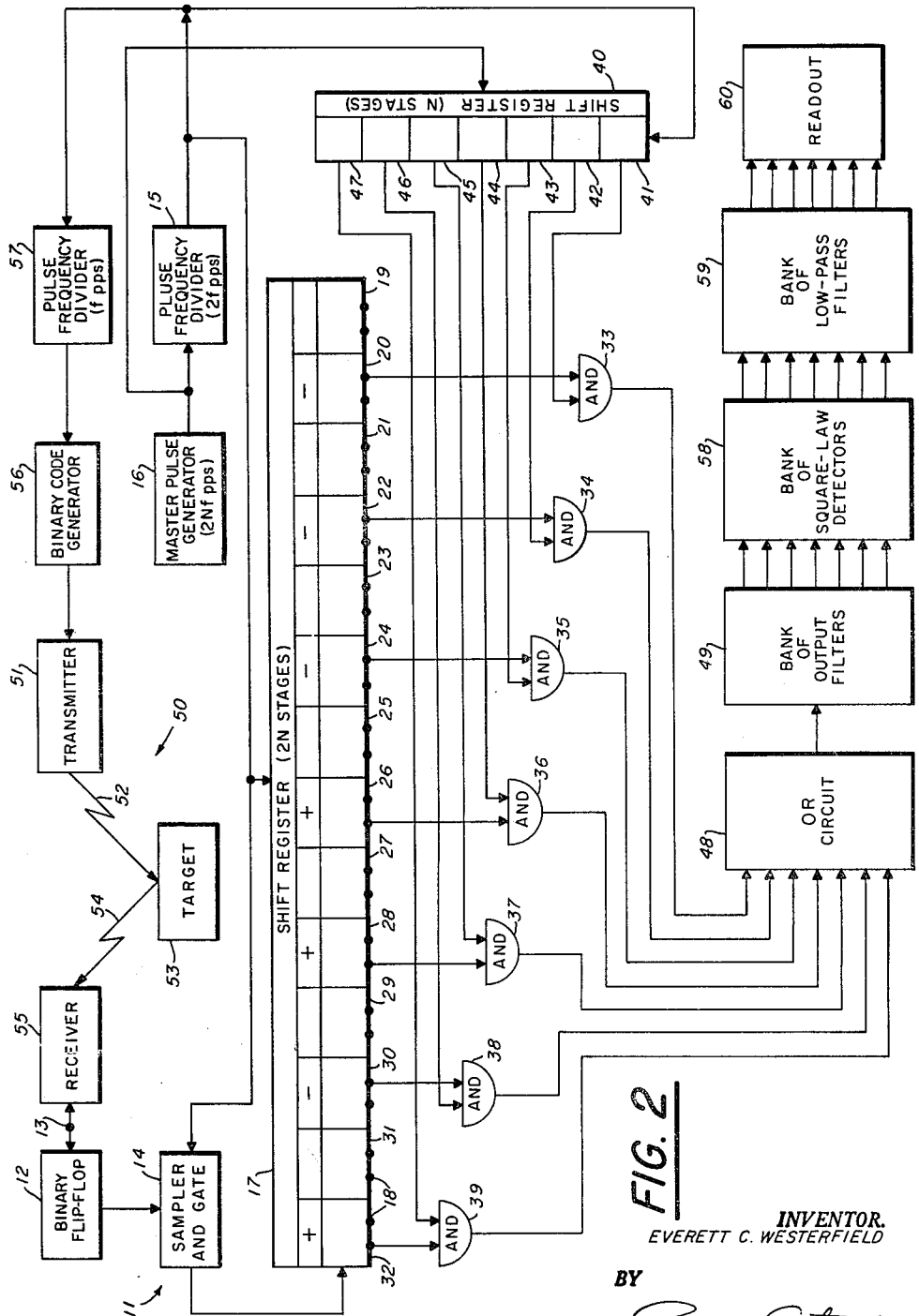
FIG. 2 is a block diagram representing a preferred embodiment of a new and unusual echo-ranging system uniquely incorporating the sequential matched filter of FIG. 1 therein.

Referring now to FIGS. 1 and 2, there is shown a sequential matched filter 11 as having a binary flip-flop 12 which has the input signal applied thereto from a terminal 13. The output of binary flip-flop 12 is a limited, substantially square wave that is applied to a sampler And gate 14 which, in turn, is timely opened by the output pulses of a pulse frequency divider 15. A master pulse generator 16 generates appropriate output pulses at the rate of $2Nf$ pulses per second, where N is the number of information bits programmed and stored for reference purposes and $f$ is the bit rate, as will be more fully described, subsequently. The output of master pulse generator 16 is applied to the input of pulse frequency divider 15.

The output pulse signals from pulse frequency divider 15 are also fed as shift pulses to a sequentially shifted shift register 17 having 2N stages with the parallel output taps of alternate stages thereof programmed with binary bits comparable in polarity and in the same sequential order as the encoded reference program with which said input signals are being correlated or matched. Shift register 17 also receives as its input signal the sample output sample signal from sampler And gate 14, and it shifts said sample from left to right in this particular case until it has passed through each of the stages and dropped out at the right end, as is normal in many conventional digital shift registers. Each stage of shift register 17 has a pair of parallel output taps which are exemplarily indicated as black dots 18. For convenience of notation, the left dot of each stage will designate a plus tap and the right dot thereof will designate a minus tap. The convention in this terminology is that the signal appearing on the plus tap of a stage will have the same polarity as that of the signal sample in the stage and the signal appearing on the minus tap will have the opposite polarity. Thus, for instance, if the signal sample in any particular stage of shift register 17 is plus, the output on the left tap thereof will be a plus and the output on the right tap thereof will be a minus. Conversely, if the signal sample in the stage is minus, the output on the left tap thereof will be minus and that on the right tap thereof will be plus. Regarding this, it should be understood of course, that the plus or minus is only with respect to some reference voltage and has the same significance as "0" or "1" in binary logic. Shift register 17, of course, may be any of many well known suitable types, with the choice thereof, including the number of stages incorporated therein, only limited by the complexity of binary program preferred or perhaps physical size. Accordingly, commercially available electronic digital shift registers are compatible with the other cooperating components of the subject system and are, thus, quite satisfactory for this purpose, too.

In the presently disclosed embodiment, shift register 17 contains 14 exemplary stages, referenced in FIGS. 1 and 2 of the drawing as stages 19 through 32 when reading from right to left. It can be seen that in this case there are twice as many stages as there are information bits (N) stored therein. Respectively connected to either the plus or minus parallel output tap of alternate stages of this exemplary shift register are a plurality of And gates referenced as And gates 33 through 39. The choice of plus or minus taps is made in accordance with the particular reference program to be stored therein. In the exemplary case illustrated, And gates 33, 34, 35, and 38 are all respectively connected to the minus taps of stages 20, 22, 24 and 30, and And gates 36, 37, and 39 are likewise respectively depicted as having one of its inputs connected to the plus tap of stages 26, 28, and 32. This accomplishes the storage of a minus for stage 20, a minus for stage 22, a minus for stage 24, a plus for stage 26, a plus for stage 28, a minus for stage 30, and a plus for stage 32 in accordance with the binary program depicted in FIG. 5(b), as will be explained more fully later on in connection with the description of the operation of the instant invention. However, although so programmed in the presently described preferred embodiment thereof, it should be understood at this time that any appropriate program may be used to effect noise-like intelligence, or secure communication signals as desired, depending on the intended use and operational environment of the invention.

Moreover, it should be understood that shift register 17 may have any predetermined binary program or programs stored thereon merely by properly selecting the output taps of any or all pertinent stages and respectively connecting And gates and their associated output circuitry thereto, inasmuch as so doing would obviously be well within the purview of the skilled artisan having the benefit of the teachings herein presented. In other words, one of the advantages of this invention is that in actual practice any number of different programs may be effectively stored simultaneously on the stages of shift register 17 by properly adding thereto more of the aforementioned And gates and associated OR circuit and filter processing equipment, etc. For instance, several different Doppler compressions and expansions may be programmed on shift register 17 so that a simultaneous search may be made over a wide range of Doppler. To effect such programs, either adjacent or alternate stages may be used in some or all parts thereof, or, if so desired, separate sets or groups of stages may be selectively connected to separate sets or groups of And gates and processing apparatus in accordance with any predetermined operational requirements.

Another sequentially shifted digital shift register 40 containing N stages referenced as stages 41 through 47, is coupled to the aforesaid master pulse generator 16 for receiving shift pulse signals therefrom at the rate of 2Nf pulses per second. It is also coupled to the output of pulse frequency divider 15 for receiving positive 2f pulse per second pulse signals to be shifted successively through stages 41 through 47 thereof. The outputs of said stages 41 through 47 are respectively connected to the other inputs of And gates 33 through 39.

The outputs of the aforementioned And gates 33 through 39 are each applied to an OR circuit 48 of the type which automatically selects the input signal having the greatest voltage level and supplies it as the output therefrom. The output from OR circuit 48 is applied to a bank of output filters 49. Because bank of output filters 49 is well known in the art, it is herein illustrated as a single block, but it actually contains a plurality of bandpass filters, each of which has its own frequency pass band, appropriately designed in accordance with the input signal to be analyzed and the binary replica thereof stored in the aforesaid shift register 17 or in accordance with the frequencies of the signals obtained due to any particular application or use to which the subject sequential matched filter is put. Since the sampled binary signals from And gates 33 through 39 are digital in nature any frequency shift caused by Doppler will merely show up by a bunching or spreading of the reversals of polarity. It can be seen that if the digital or binary signals are converted into analog signals such as that of waveform 3A, or into individual frequency components thereof, this information, i.e., the frequency shift due to Doppler, can be observed and measured. This in effect is the purpose of output filters 49. Although not shown in the drawing, the outputs from bank of output filter 49 may be applied to any pertinent frequency meter, computer, indicator, recorder, readout, sonar or radar, or any other apparatus for preferred utilization purposes.

Referring specifically now to FIG. 2, there is shown an exemplary embodiment of the subject invention which uniquely combines an echo-ranging system, such as, for example, a sonar system or a radar system, in a new and unusual arrangement with the aforementioned sequential matched filter. Inasmuch, however, as said sequential matched filter is identical with the one described above, the referenced numerals used in connection therewith are also identical in order to herein simplify disclosure thereof.

Assuming for the purpose of this disclosure that said echo-ranging system is a sonar system (while not being limited thereto) to further simplify and expedite explanation thereof, there is shown in FIG. 2 a programmed sonar system 50 consisting of any conventional transmitter 51 that heterodynes up an encoded signal constituting an intelligence information signal with binary waveform characteristics to a higher frequency signal for the express purpose of broadcasting it as an optimum search signal 52 throughout a predetermined area of a subaqueous environmental medium. Upon contact with an underwater target 53, it is reflected therefrom as an echo-return signal 54 which is received by a sonar receiver 55. Receiver 55 is also of the heterodyne type and is so constructed as to heterodyne down the receiver echo signal to a frequency range which is somewhat higher than the frequency range of the original input signal to transmitter 51, as will be more fully described, subsequently. Preferably, the frequencies of the heterodyned down echo signal should be high enough above the corresponding frequencies of the originally programmed signal applied to transmitter 51 to prevent Doppler ambiguity; that is, to facilitate distinguishing between up and down Doppler and prevent the difference frequency between corresponding frequencies from ever equaling zero.

To transmitter 51, is fed a binary signal that has been encoded by a binary code generator 56 in accordance with a predetermined program that is suitable for the type of communication or echo-ranging operationally existing at any given time. Binary code generator 56 is timely triggered by the $f$ pulses per second output pulses of a pulse frequency divider 57 which, in turn, receives its input pulses from the output of the aforementioned pulse frequency divider 15.

While the encoded signal broadcast from transmitter 51 is travelling through seawater or the like, it may become modulated or modified by many things such as, for instance, spurious noise, reverberations, velocity gradient, phase shifts, frequency shifts, etc., plus being Dopplerized by contact with target 53, in event there is any relative movement between the vessel containing the subject invention and said target. Consequently, as received, said echo signal would be modified considerably and no longer have the waveform it had when it was originally broadcast and, hence, would be unrecognizable unless systematically sampled and statistically analyzed to ferret out the intelligence information portion thereof. To accomplish this, the heterodyned down output signal from receiver 55 is applied to input terminal 13 of the foregoing sequential matched filter 11 for processing thereby accordingly.

Attached to the outputs of bank of output filters 49 is a bank of square-law detectors 58. Each of said square-law detectors are respectively connected to the corresponding filter of said bank of output filters, and each of said square-law detectors are of the type which squares the input signal thereto and thereby rectifies it to provide an output signal having positive polarity. As a matter of fact, it has been found in practice that the square-law detector is only a little more efficient than the simpler linear rectifier for detection purposes, so actually a band of linear rectifiers may be used instead of the bank of square-law detectors if so desired. The outputs from said bank of square-law detectors 58 are then fed through a bank of low-pass filters 59 to a readout 60 or any other utilization apparatus as desired.

It should be understood that all of the foregoing individual elements and components of the subject invention that are represented by appropriately interconnected blocks in FIGS. 1 and 2 of the drawing are conventional and well known in the art, and that it is their unique arrangement, interconnection, and interaction that produces new and useful results and, hence, constitutes the present invention.

Moreover, as previously mentioned, the embodiment of the subject invention herein disclosed in FIG. 2 refers to a sonar system in particular, but it should also be understood that any suitable echo-ranging system such as radar or the like are equally applicable and intended to be incorporated in this disclosure, inasmuch as making the transition from one to the other would obviously only involve the making of appropriate design choices, the doing of which would be well within the purview of the skilled artisan in view of the teachings presented above.

The operation of the sequential matched filter depicted in FIG. 1 will now be discussed in connection with FIGS. 3 through 6.

The input signal to be processed by the subject system is, of course, a particular type of signal in that, among other things, it has been encoded with a known binary program by equipment operably associated therewith but may or may not necessarily be a part thereof. This input signal may have been modified or altered by its environment or otherwise in such manner to include phase shifts, noise or other spurious signals, which causes the waveform of the known encoded program included therein to be changed to the extent that it may be unrecognizable and incapable of being efficiently correlated with a replica thereof by direct comparison methods. Such an input signal is exemplarily represented by the waveform of FIG. 3($a$).

Figure 3:
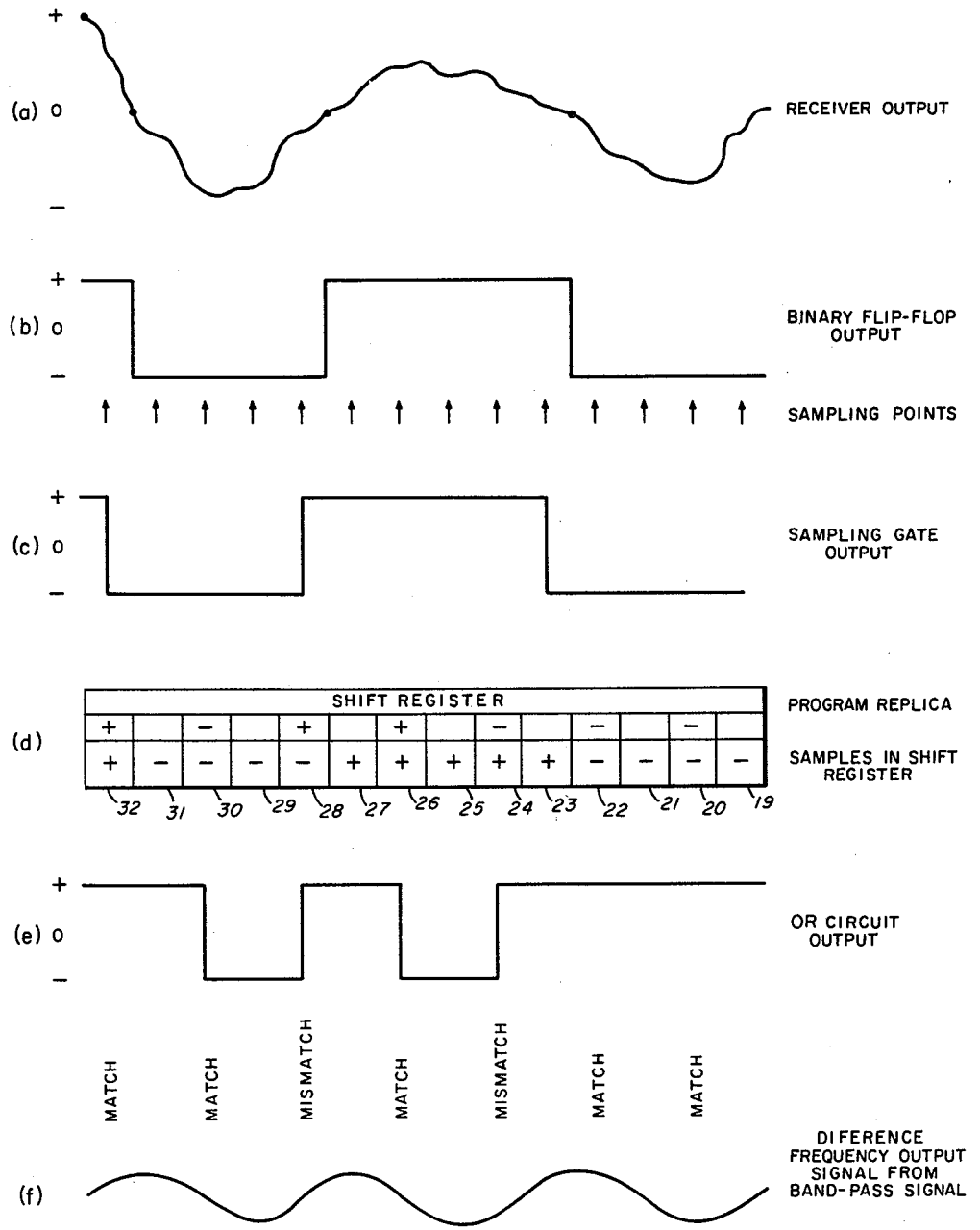
FIG. 3 is a graphical representation of the output waveforms from various and sundry components of the subject invention.

When this waveform is applied as the input signal to binary flip-flop 12, it is converted to a waveform having substantially square leading and lagging edges which respectively occur as it changes from a positive polarity to a negative polarity and vice versa, as is shown in FIG. 3($b$). This waveform is then timely sampled by means of sampler And gate 14 which, in turn, is opened at the rate of $2f$ times per second, due to the application of $2f$ pulses per second from pulse frequency divider 15. Master pulse generator 16, of course, supplies $2Nf$ pulses per second to pulse frequency divider 15 for conversion thereof to $2f$ pulses per second. The output pulse type waveforms from master pulse generator 16 and pulse frequency divider 15 are respectively represented by FIGS. 4($a$) and 4($b$), with the N and $f$ letter designations respectively referring to the number of information bits programmed and stored for reference purposes and the effective bit processing rate. The arrows disposed beneath FIG. 3($b$) indicate exemplary points in time at which the waveform of FIG. 3($b$) is sampled.

If it is considered that the right hand end of the binary flip-flop output signal is fed into sampler And gate 14 first and sampling occurs at the arrows, the output of sample And gate 14 will be represented by the waveform of FIG. 3($c$), and this waveform is the one that is fed into shift register 17 at the rate of $2f$ samples per second.

Assuming for the purpose of this discussion that the waveform of FIG. 3($c$) has been completely shifted into shift register 17, wherein the correlation or matching operation of the polarity thereof with the respective polarity of the binary bit stored on each stage has timely occurred, and letting FIG. 3($d$) represent shift register 17 with the reference program replica stored thereon, as shown, it can be seen while analyzing the stages thereof from right to left that a match occurs in stages 20, 22, 26, 30, and 32 and that a mismatch occurs in stages 24 and 28 at this particular instant. Accordingly, since shift register 17 is connected so as to produce a positive parallel output signal at each stage where a match occurs and a negative parallel output signal at each stage where a mismatch occurs, a plurality of corresponding positive and negative signals are emitted therefrom which are substantially representative of the degree and quality of match between the input signal and the binary program stored therein. But to effectively separate the known coherent signal from the unwanted incoherent and spurious signals to make such signals discernable, intelligible, and useful, further processing thereof is necessary. This is effected by simultaneously supplying them to And gates 33 through 39 which are sequentially opened to pass a positive signal whenever a pair of positive signals are simultaneously applied to the inputs thereof. One of said positive pulses is supplied by shift register 40 in accordance with the timely shifting of a positive pulse therethrough. In other words, as the positive pulse from pulse frequency divider 15 is successively shifted through stages 41 through 47 of shift register 40, the stage thereof containing said pulse at any given instant supplies it to its corresponding electrically associated And gate. In event that same And gate also receives a positive signal from its electrically associated stage of shift register 17 due to a match existing therein, a position signal is fed to OR circuit 48. Because shift register 40 is shifted at the rate of 2N$f$ shifts per second and because shift register 17 is shifted at the rate of 2$f$ shifts per second, the designated output of each stage of shift register 17 is sequentially "sampled" for matching or mismatching purposes before a new bit is shifted thereinto. Hence, the And gates respectively associated therewith thus sequentially produce a positive output signal if a pair of positive input signals are applied thereto as a result of a match existing in that particular stage of shift register 17 and the signal from the respective stage of shift register 40 being coincident.

Each of the outputs of And gates 33 through 39 are applied to OR circuit 48 as they occur. The only And gate circuit that can have a plus output at any given instant is the one which is being supplied with a positive pulse from shift register 40 at that instant. Therefore, the output of OR circuit 48 at any given instant will be the same as the output of the And gate which is being supplied with a positive pulse from shift register 40 at that instant. The waveform which results on the output of OR circuit 48 as a positive pulse is shifted through shift register 40 is exemplarily illustrated in FIG. 3($e$). This waveform is applied to the input of bank of output filters 49, the output waveform of one of which is exemplarily illustrated in FIG. 3($f$). The output power from one of these output filters is typically depicted as a function of time by the curve of FIG. 6. The maximum output signal power will occur on the output of the output filter which is most closely matched for the Doppler frequency shift in the received signal and will occur at the time when the signal that has been sampled into shift register 17 is most closely matched in time delay to the reference program stored therein.

Briefly, the operation of the sonar system incorporating the aforementioned sequential matched filter is as follows in connection with FIGS. 2 through 7:

As illustrated in FIG. 2, the output of pulse frequency divider 15 is applied to another pulse frequency divider 57 which divides the 2$f$ pulses per second into a signal having $f$ pulses per second. This signal is typically represented by the waveform of FIG. 4($c$) and is again represented by the waveform of FIG. 5($a$) on a different time scale. This signal timely triggers binary code generator to effect production of a binary encoded signal of the type exemplarily represented by the waveform of FIG. 5($b$). Although the sequence of binary bits of said waveform of FIG. 5($b$) may appear to be random to the casual observer, they are generated in accordance with a predetermined program with as long a grand cycle as is desired for any given operational circumstances.

This encoded signal is then heterodyned up to some optimum broadcast frequency band and transmitted throughout a subaqueous medium by transmitter 51. Its echo from any target 53 submerged within said medium is received by receiver 55 and heterodyned back down to some desired low frequency band which is slightly higher than the frequency band of the original encoded program signal prior to its being heterodyned up to said optimum broadcast frequency band.

This heterodyning operation is a desirable feature because, in event the target echo signal contained a Doppler, a difference frequency would appear on the output of the receiver, and this difference frequency would not inherently distinguish between or give an indication of said Doppler in terms of up Doppler or down Doppler, if there was a crossing of the zero frequency point. To prevent this type of Doppler ambiguity from occurring, an artificial difference frequency is introduced by the aforesaid heterodyning up and down technique which, of course, automatically causes a sufficient difference frequency to be maintained at all times, thereby eliminating the possibility of the occurrence of said zero frequency crossing.

The output of receiver 55 is then applied to input terminal 13 of the aforementioned sequential matched filter 11, where it is processed in exactly the same manner as the input signal was processed in the device of FIG. 1 described above. In addition, however, this signal is further processed by feeding the output signal from any one filter of bank of output filters 49 to the corresponding square-law detector or linear rectifier of bank of square-law detectors 58 prior to being filtered through the appropriate filter of bank of low-pass filters 59 and indicated or recorded by any suitable readout 60. Due to the presence of the aforementioned artificial difference frequency and actual Doppler, if any, the output from any one of the appropriate bandpass filter of bank of output filters 49 will be substantially a sine wave as exemplarily represented by the waveform of FIG. 3($f$), but, of course, it may be indicated or recorded in any desired terms or paramters such as, for instance, range rate by readout 60.

The output of the corresponding low-pass filter of bank of low-pass filters 59 will be a measure of the output power of the said appropriate bandpass filter, as exemplarily represented in FIG. 6. This said output of said corresponding low-pass filter will correspond to and represent the envelope of the cross-correlation function between the received signal and the stored program replica, and, as such, will pass through a peak at the time when the signal which has been sampled into shift register 17 is most closely matched in time delay with the stored replica of the original signal prior to transmission.

Obviously, many modifications and variations of the present invention are possible in the light of the above teachings. It is, therefore, to be understood that within the scope of the appended claims, the invention may be practiced otherwise than as specifically described.

What is claimed is:

1. A sequential matched filter comprising in combination, a master pulse generator, a pulse frequency divider coupled to the output of said master pulse generator, a binary flip-flop adapted for receiving and converting a varying amplitude encoded intelligence signal into a two-level binary signal, a sampler And gate connected to the outputs of said binary flip-flop and said pulse frequency divider, a shift register having a plurality of stages with a predetermined binary program stored thereon, said shift register being connected to said pulse frequency divider for being shifted by the output pulses therefrom and to the output of said sampler And gate for receiving the samples of the encoded intelligence signal to be shifted therethrough, and means connected to the outputs of said master pulse generator and said pulse frequency divider and to said shift register for sequentially scanning the outputs thereof and converting same into a single analog signal.

2. A sequential matched filter comprising in combination, a master pulse generator, a pulse frequency divider coupled to the output of said master pulse generator, a binary flip-flop adapted for receiving and converting a varying amplitude intelligence signal into a two-level binary signal, a sampler And gate connected to the outputs of said binary flip-flop and said pulse frequency divider, a shift register having a plurality of stages with a predetermined binary program stored thereon, said shift register being connected to said pulse frequency divider for being shifted by the output pulses therefrom and to the output of said sampler And gate for receiving the samples of the binary intelligence signal to be shifted therethrough, a second shift register connected for being shifted by the outputs of said master pulse generator and for receiving the pulses of said pulse frequency divider in such manner that they are shifted therethrough, a plurality of And gates having inputs respectively connected to the outputs of said first mentioned and second shift registers in accordance with the aforesaid predetermined stored binary program, an OR circuit coupled to the outputs of said And gates, and means connected to said OR circuit for filtering the output therefrom.

3. A sequential matched filter comprising in combination, a master pulse generator, a pulse frequency divider coupled to the output of said master pulse generator, a binary flip-flop adapted for receiving and converting a varying amplitude encoded intelligence signal into a two-level binary signal, a sampler And gate connected to the outputs of said binary flip-flop and said pulse frequency divider, a shift register having a plurality of stages with a predetermined binary program stored thereon, said shift register being connected to said pulse frequency divider for being shifted by the output pulses therefrom and to the output of said sampler And gate for receiving the samples of the binary intelligence signal to be shifted therethrough, a second shift register connected for being shifted by the outputs of said master pulse generator and for receiving the pulses of said pulse frequency divider in such manner that they are shifted therethrough, a plurality of And gates having inputs respectively connected to the outputs of said first mentioned and second shift registers in accordance with the aforesaid predetermined stored binary program, and means connected to the outputs of said And gates for converting same into a unitary parameter representing the degree of match between the aforesaid encoded intelligence input signal and the predetermined binary program stored in the stages of said first shift register.

4. A sequential matched filter comprising in combination, means for shaping an electrical signal having a predetermined binary program encoded therein, means coupled to the output of said shaping means for timely sampling the shaped signal therefrom, a first shift register connected to the output of said sampling means, said first shift register having a plurality of stages with a replica of said predetermined binary program stored therein, said first shift register having a pair of taps disposed in each of said stages for effecting a positive output voltage at one thereof when the polarity of the aforesaid samples matches the polarity of that portion of said replica stored therein, a second shift register, means connected to said first and second shift registers for simultaneously shifting said first shift register and supplying a positive pulse to said second shift register for being successively shifted through the stages thereof, means connected to said second shift register for timely shifting same, a plurality of And gates each of which has a pair of inputs and an output, said And gates being adapted for producing a positive signal at the output thereof when a pair of positive pulses are coincidentally applied to the inputs thereof with one of said inputs of each of said And gates respectively connected to the tap of one of the stages of said first shift register representing the polarity of the binary program stored therein and the other of said inputs of each of said And gates respectively coupled to the outputs of the stages of said second shift register, and means connected to the outputs of the aforesaid And gates for effectively converting same into a unitary voltage parameter.

5. An echo-ranging system comprising in combination, means for broadcasting a programmed target search signal, means associated with said broadcasting means for receiving an echo of said search signal after it has been reflected by a target, means connected to said receiving means for statistically sampling said received echo signal, synchronizing means connected to said sampling means and the aforesaid broadcasting means for synchronously actuating each, a sequential matched filter connected to an output of said sampling means and said synchronizing means for producing an analog signal proportional to degree of match between said echo signal samples and the program of said programmed target search signal at any given instant.

6. A sonar system comprising in combination, a transmitter, a binary code generator connected to said transmitter for driving same in accordance with a predetermined binary program, a receiver adapted to receive an encoded signal broadcast by said transmitter after it has been reflected by a target, means effectively connected to the output of said receiver for shaping and sampling the signal received thereby, means effectively connected between said shaping and sampling means and the aforesaid binary code generator for matching the samples of said received signal with a replica of said binary program stored therein and respectively producing a plurality of outputs in accordance therewith, means coupled to said sample matching means for effectively sequentially scanning said plurality of outputs and transforming same into a unitary analog signal having an amplitude corresponding to the degree of match between said sample received signals and said replica of said binary coded program, and means coupled to the output of said scanning and transforming means for converting said analog signal into an output signal proportional to and indicative of the relative range rate between said receiver and the aforesaid target at any given instant.

7. An echo ranging system comprising in combination means for broadcasting a continuous signal having a predetermined asymmetrical program incorporated therein, means for receiving said continuous signal after it has been broadcast by said broadcasting means, means effectively coupled to the output of said receiving means for sampling the continuous signal received thereby, means connected to the output of said sampling means for storing a replica of said predetermined asymmetrical program, means effectively connected to said storing means for effecting the matching of samples of said received signal with the replica of said program stored in said storing means and producing an output signal representative thereof, and means coupled to the output of said sample matching means for converting the output therefrom into an analog signal having characteristics proportional to the degree of match in time delay between said sample signals and said program replica.

8. The device of claim 7 wherein said means connected to the output of said sampling means for storing a replica of said predetermined asymmetrical program therein comprises a digital shift register having a plurality of stages with each thereof having a pair of opposite polarity electrical taps for respectively producing positive and negative signals thereat in accordance with program match or mismatch conditions existing therein as said sample signals are shifted therethrough.

9. The device of claim 7 wherein said means for receiving said continuous signal after it has been broadcast by said broadcasting means is a sonar receiver.

10. The device of claim 7 wherein said means for receiving said continuous signal after it has been broadcast by said broadcasting means is a radar receiver.

11. The device of claim 7 wherein said means effectively coupled to the output of said receiving means for sampling the continuous signal received thereby includes a sampler And gate.

12. The device of claim 7 wherein said means for broadcasting a continuous signal having a predetermined asymmetrical program incorporated therein includes a transmitter and a binary code generator connected to the input thereof for supplying said predetermined asymmetrical program thereto.

13. The device of claim 12 wherein said transmitter is a sonar transmitter adapted for broadcasting said programmed continuous signal as an acoustical energy signal through a subaqueous environmental medium.

14. The device of claim 12 wherein said transmitter is adapted for broadcasting said programmed continuous signal as an electromagnetic energy signal through a spatial environmental medium.

15. The device of claim 12 wherein the predetermined asymmetrical program supplied to said transmitter by said binary code generator consists of a plurality of predetermined successive binary bits.

16. An echo-ranging system comprising in combination, a first shift register having a plurality of stages with a binary bit of given polarity stored on alternate ones thereof to respectively provide a set or reset condition therein and also adapted for shifting a sample signal successively therethrough for comparison thereof with each of said stored binary bits, said stored binary bits successively forming a predetermined program, a pair of output taps located in each of said first shift register stages containing said stored binary bits for picking off positive and negative signals therefrom in accordance with the comparative match or mismatch of said sample signal therewith respectively as same is sequentially shifted through successive stages of said first shift register, means for generating a signal containing a series of binary bits having a program identical to the program of binary bits stored in said shift register, means coupled to the output of said program generating means for transmitting a target search signal containing said program as an encoding component thereof, means for receiving and limiting said search signal after it has echoed from a target, means effectively connected to the output of said receiver for timely sampling said limited echo signal and supplying binary samples thereof to the input of said shift register, a second shift register having a plurality of stages adapted for sequentially shifting a positive pulse therethrough and producing an output signal thereat, respectively, when said positive pulse is located therein, means connected to said limited echo signal sampling means and said first and second shift registers for actuating and shifting same and supplying said positive pulse thereto, respectively, in accordance with a predetermined synchronized timing arrangement, a plurality of And gates with one of the inputs of each And gate of each pair of And gates respectively coupled to the appropriate output taps of one of the stages of said first shift register containing said stored binary bits and the other inputs of each pair of And gates appropriately connected to the outputs of the respective stages of said second shift register, an OR circuit coupled to the output of each of said And gates, a bank of output filters connected to the output of said OR circuit, a bank of square-law detectors respectively coupled to the outputs of said bank of output filters, a bank of low-pass filters respectively connected to the outputs of said bank of square-law detectors, and a readout means connected to the outputs of the aforesaid bank of low-pass filters.

17. A method of statistically ascertaining relative range rate between a search vessel and a target vessel comprising the steps of broadcasting a programmed target search signal, receiving the echo of said search signal after it has been reflected by a target, statistically sampling said received echo signals at predetermined time intervals, storing successive portions of a replica of the program of the aforesaid search signal, periodically matching said echo signal samples with each of said successive portions of said program replica, sequentially scanning the outputs corresponding to each of said successive program replica storing portions, and producing an analog output signal corresponding to the Doppler frequency shift and having an amplitude proportional to the degree of total time delay match therewith at any given instant.

18. The method of claim 17 further characterized by filtering said analog output signal to determine the frequency thereof for indicating the amount of Doppler contained therein in terms of relative range rate of said search and target vessels at any given instant.

19. A method of statistically ascertaining relative range rate between a search vessel and a target vessel comprising the steps of generating a binary signal having a program code contained therein, transmitting a search signal incorporating said coded binary signal heterodyned up to a predetermined higher frequency signal, receiving said higher frequency signal after it has been reflected as an echo signal from a target, heterodyning said received echo signal down to a lower frequency than received but to a higher frequency than the original encoded binary signal, shaping said heterodyned down signal to substantially a squarewave signal having a limited amplitude, timely sampling said substantially squarewave limited amplitude signals, storing successive portions of a replica of said coded binary signal, periodically matching said sampled signals with each of the successive portions of said replica and respectively producing a plurality of outputs in accordance therewith, sequentially scanning each of said plurality of outputs and transforming same into an analog output signal having an amplitude varying with the degree of match between said sampled limited amplitude signals and said successive portions of said replica at any given instant, and converting said analog output signal into an output signal proportional to the relative range rate between the aforesaid search and target vessels at any given instant.

No references cited.

CHESTER L. JUSTUS, *Primary Examiner.*

KATHLEEN CLAFFY, *Examiner.*